United States Patent
Shimizu et al.

(10) Patent No.: US 7,356,954 B2
(45) Date of Patent: Apr. 15, 2008

(54) IN-VEHICLE DISPLAY APPARATUS

(75) Inventors: Yukio Shimizu, Hyogo (JP); Shinsuke Yuri, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 386 days.

(21) Appl. No.: 10/999,138

(22) Filed: Nov. 30, 2004

(65) Prior Publication Data
US 2005/0144819 A1 Jul. 7, 2005

(51) Int. Cl.
*G09F 11/00* (2006.01)
*E05D 11/06* (2006.01)

(52) U.S. Cl. .................. 40/491; 40/492; 16/358; 16/362; 361/681; 361/682

(58) Field of Classification Search .............. 16/237, 16/289, 358, 360, 369, 370, 371, 387; 40/429–438, 40/491, 492, 530, 534–537; 312/7.2, 223.1, 312/223.2, 311; 361/681, 682
See application file for complete search history.

(56) References Cited

U.S. PATENT DOCUMENTS

| | | | | |
|---|---|---|---|---|
| 4,843,680 | A * | 7/1989 | Cress et al. | 16/289 |
| 5,535,482 | A * | 7/1996 | Grabber | 16/286 |
| 5,941,615 | A * | 8/1999 | Ito et al. | 312/7.2 |
| 6,659,405 | B1 * | 12/2003 | Takagi et al. | 248/27.1 |
| 7,119,455 | B2 * | 10/2006 | Kishi et al. | 307/9.1 |
| 7,137,676 | B2 * | 11/2006 | Sugimoto et al. | 312/7.2 |
| 7,159,226 | B2 * | 1/2007 | Sasaki et al. | 720/646 |
| 7,165,798 | B2 * | 1/2007 | Chamberlain et al. | 296/37.1 |

FOREIGN PATENT DOCUMENTS

| | | | |
|---|---|---|---|
| JP | | A 05-042853 | 2/1993 |
| JP | | A 09-254720 | 9/1997 |
| JP | | A 2001-132309 | 5/2001 |
| JP | | A 2001-148821 | 5/2001 |
| JP | | A 2002-087174 | 3/2002 |
| JP | | A 2002-104087 | 4/2002 |
| JP | | A 2002-318549 | 10/2002 |

* cited by examiner

*Primary Examiner*—James R. Brittain
*Assistant Examiner*—Ruth C. Rodriguez
(74) *Attorney, Agent, or Firm*—Oliff & Berridge, PLC

(57) ABSTRACT

A main unit includes a slider and a guide groove. A display panel includes a slider engaging portion coupled to the slider being guided by the slider and a guide-groove engaging portion slidably engaged with the guide groove being guided by the guide-groove so that the display panel can be inclined. A pressing lever presses the guide-groove engaging portion with resilient force of a resilient member. The guide-groove includes a parallel groove formed in parallel with a direction of movement of the slider; and a curved groove having a width narrower than that of the parallel groove and being connected to the parallel groove. The guide-groove engaging portion moves in the parallel groove by the movement of the slider and a pressing force of the pressing lever.

13 Claims, 14 Drawing Sheets

IN-VEHICLE DISPLAY APPARATUS

BACKGROUND OF THE INVENTION

1.) Field of the Invention

The present invention relates to a display apparatus to be mounted as in-vehicle equipment, and in particular to an in-vehicle display apparatus that can provide an excellent appearance by a proper positioning.

2.) Description of the Related Art

In a vehicle such as an automobile, various electronic devices for reproducing a recording medium such as compact disk (CD), magnetic disk (MD), or digital versatile disk (DVD) is mounted on a mount member such as a dashboard or an instrument panel, and an in-vehicle display apparatus provided with a display panel such as a liquid crystal panel is used in each of the electronic devices (see, for example, Japanese Patent Application Laid-open Publication No. H5-42853). For example, the in-vehicle display apparatus is assembled so as to be capable of being inclined to a user's side by drawing a lower portion of a display panel out of a main unit of the display apparatus in order to load/unload a recording medium, and it is mounted at a proper position on a vehicle interior mount member such as a dashboard or an instrument panel.

The in-vehicle display apparatus is mounted using various connectors such that the display panel can be inclined to the main unit. Therefore, considering a tolerance of the display panel or the main unit, and further a tolerance of a vehicle interior mount member such as an instrument panel, or an allowable range of mounting, the in-vehicle display apparatus must be mounted with a large clearance between the display panel and a mount member such as an instrument panel in a widthwise direction or in a vertical direction. However, when the clearance is excessive, there occurs a problem that the appearance of the in-vehicle display apparatus becomes poor, which results in marring the beauty of a vehicle interior.

SUMMARY OF THE INVENTION

It is an object of the present invention to solve at least the above problems in the conventional technology.

A display apparatus according to one aspect of the present invention includes a main unit including a slider and a guide groove; a display panel including a slider engaging portion coupled to the slider and a guide-groove engaging portion slidably engaged with the guide groove, where the slider engaging portion is guided by the slider and the guide-groove engaging portion is guided by the guide-groove so that display can be inclined; and a pressing lever pressing the guide-groove engaging portion with resilient force of a resilient member. The guide-groove includes a parallel groove formed in parallel with a first direction which is a direction of movement of the slider; and a curved groove having a width narrower than that of the parallel groove and being connected to the parallel groove. The guide-groove engaging portion moves in the parallel groove by the movement of the slider and a pressing force of the pressing lever.

The other objects, features, and advantages of the present invention are specifically set forth in or will become apparent from the following detailed description of the invention when read in conjunction with the accompanying drawings.

DETAILED DESCRIPTION

Exemplary embodiments of an in-vehicle display apparatus according to the present invention will be explained in detail with reference to the accompanying drawings.

Figure 1:
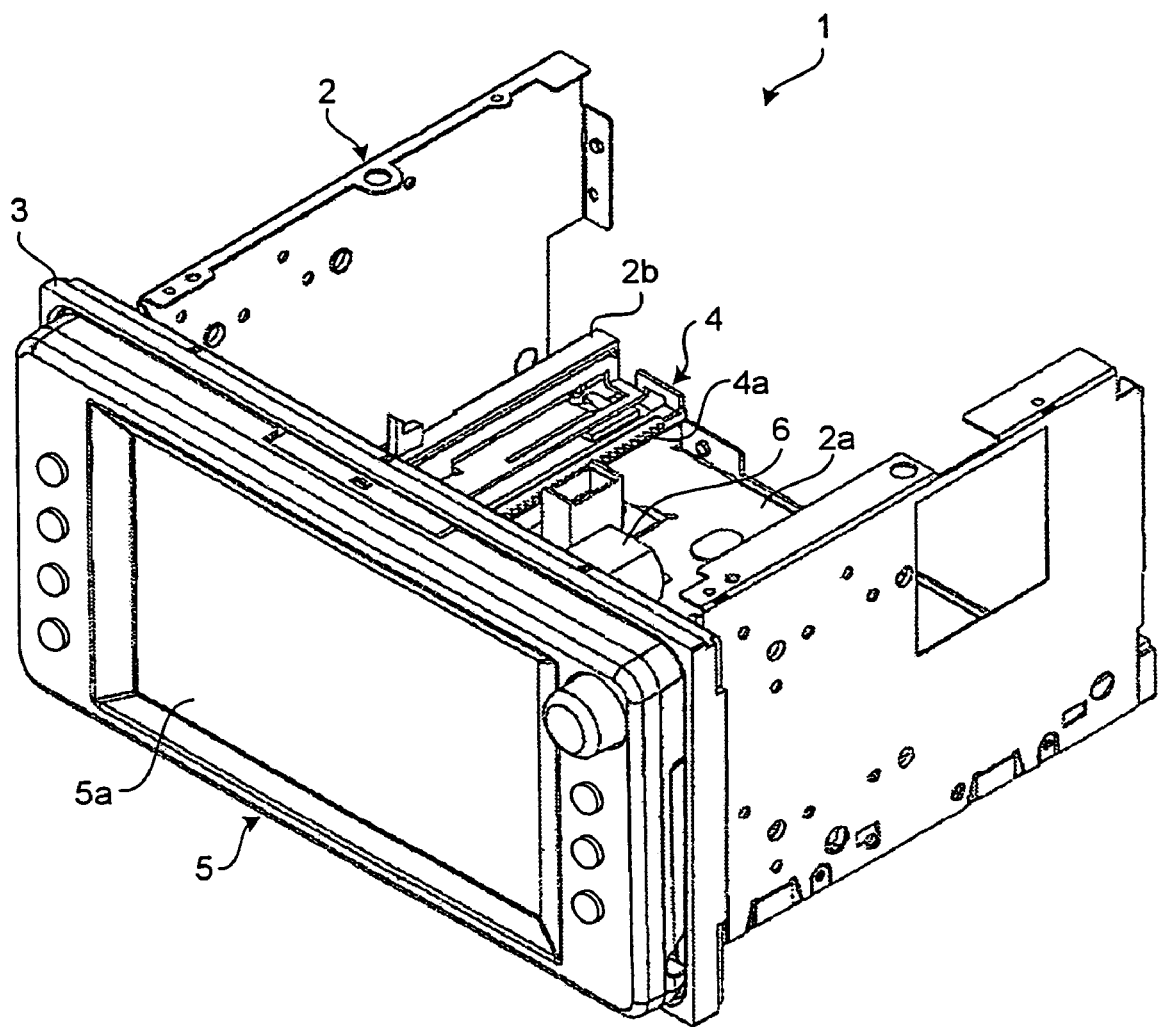
FIG. 1 is a perspective view of a display apparatus according to a first embodiment of the present invention.
Figure 2:
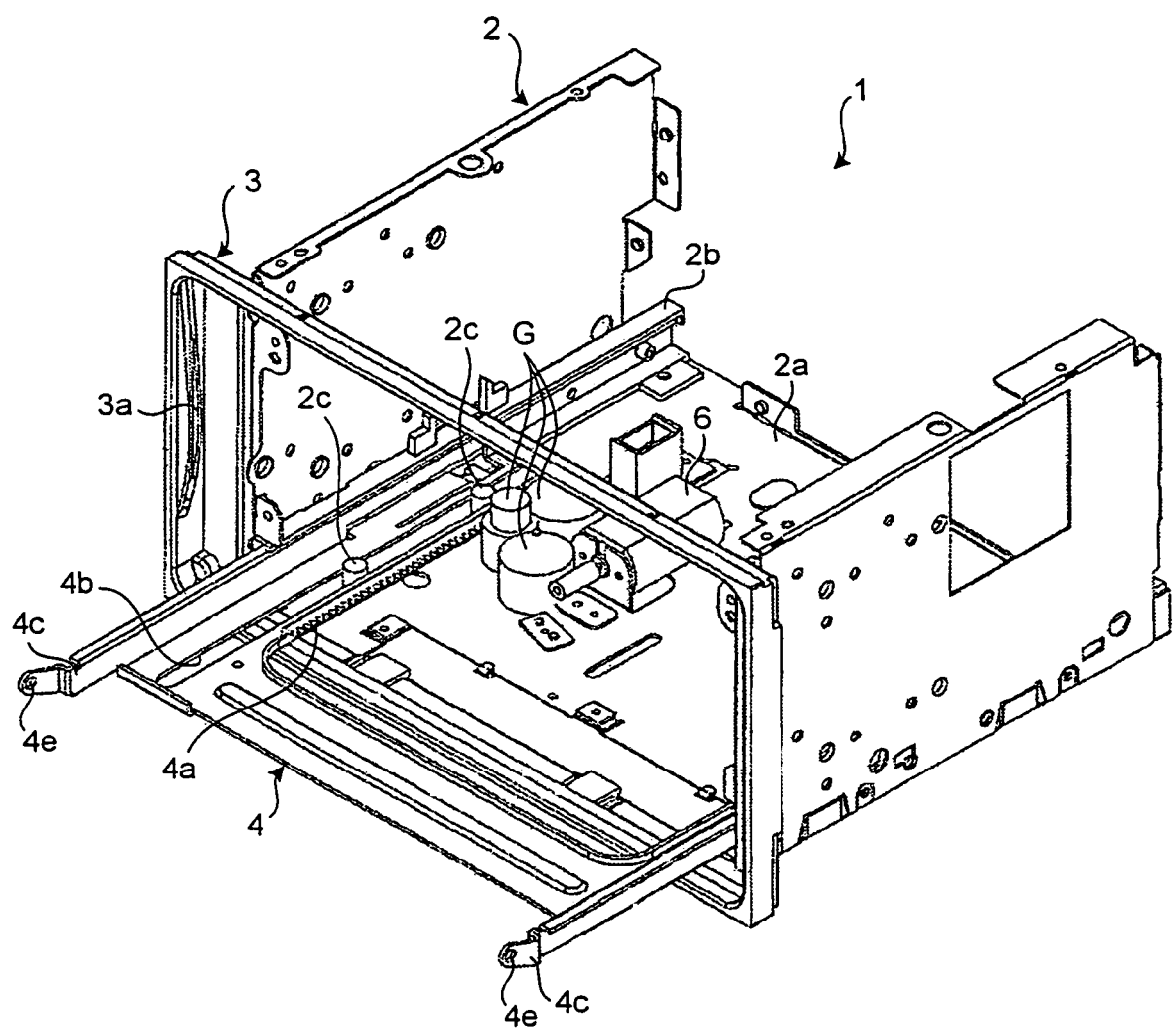
FIG. 2 is a perspective view of the display apparatus shown in FIG. 1 from which a display panel has been removed.
Figure 3:
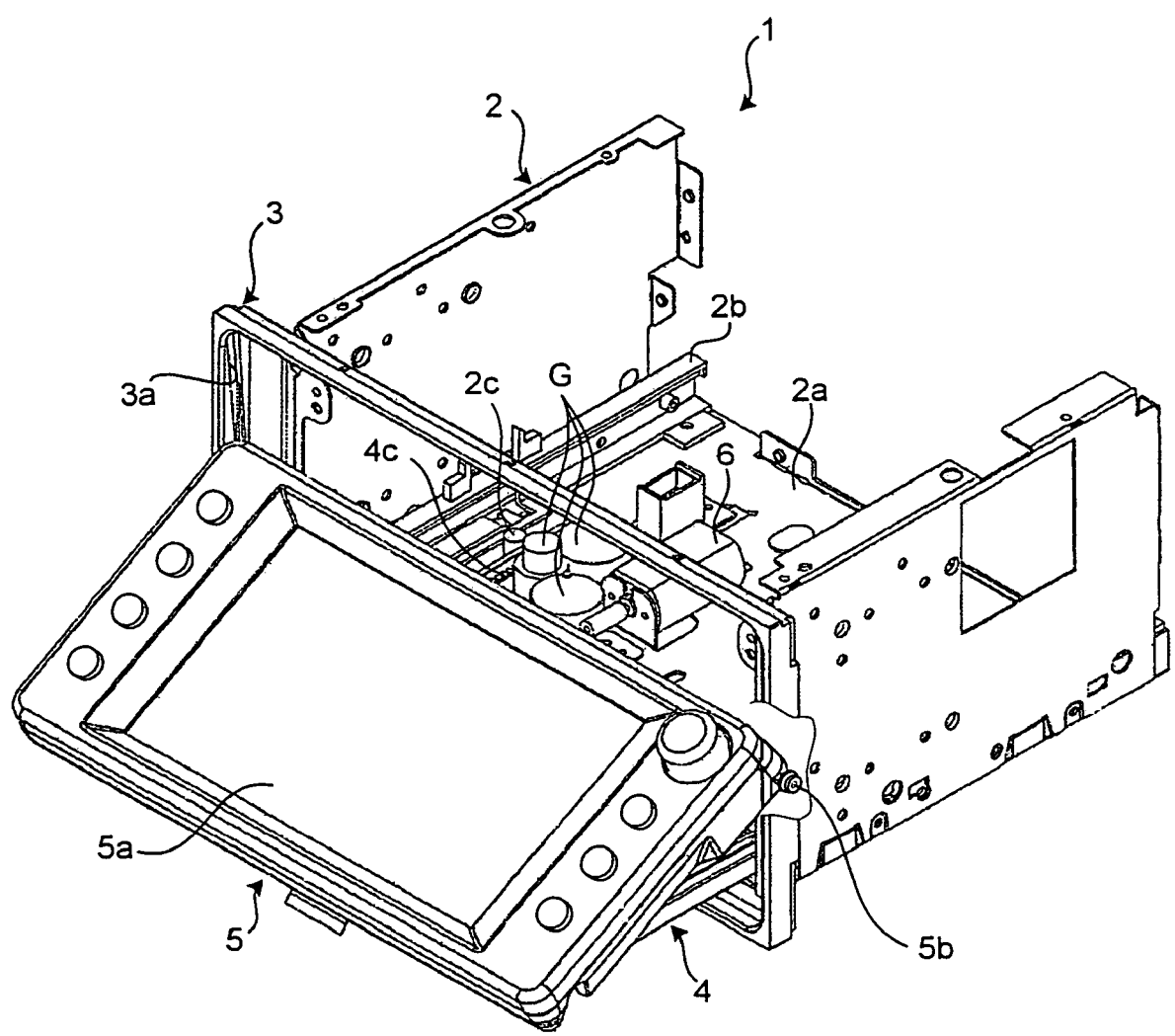
FIG. 3 is a perspective view of a state where the display panel is inclined in the display apparatus shown in FIG. 1.

FIG. 1 is a perspective view of an in-vehicle display apparatus (hereinafter, "a display apparatus") 1 according to a first embodiment of the present invention. FIG. 2 is a perspective view of the display apparatus 1 shown in FIG. 1, from which a display panel has been removed. FIG. 3 is a perspective view of a state where a display panel has been inclined in the display apparatus 1 shown in FIG. 1. The display apparatus 1 includes a main unit 2 and a display panel 5.

The main unit 2 is a casing where a unit in which various electronic devices, which reproduce a recording medium such as CD, MD, and DVD, are used is disposed. As shown in FIGS. 1 to 3, the main unit 2 is attached with a framed front panel 3 serving as an accommodating unit at a front portion thereof and is provided on a bottom plate 2a with a slider 4 such that the slider 4 can be drawn out in a horizontal direction.

Figure 4:
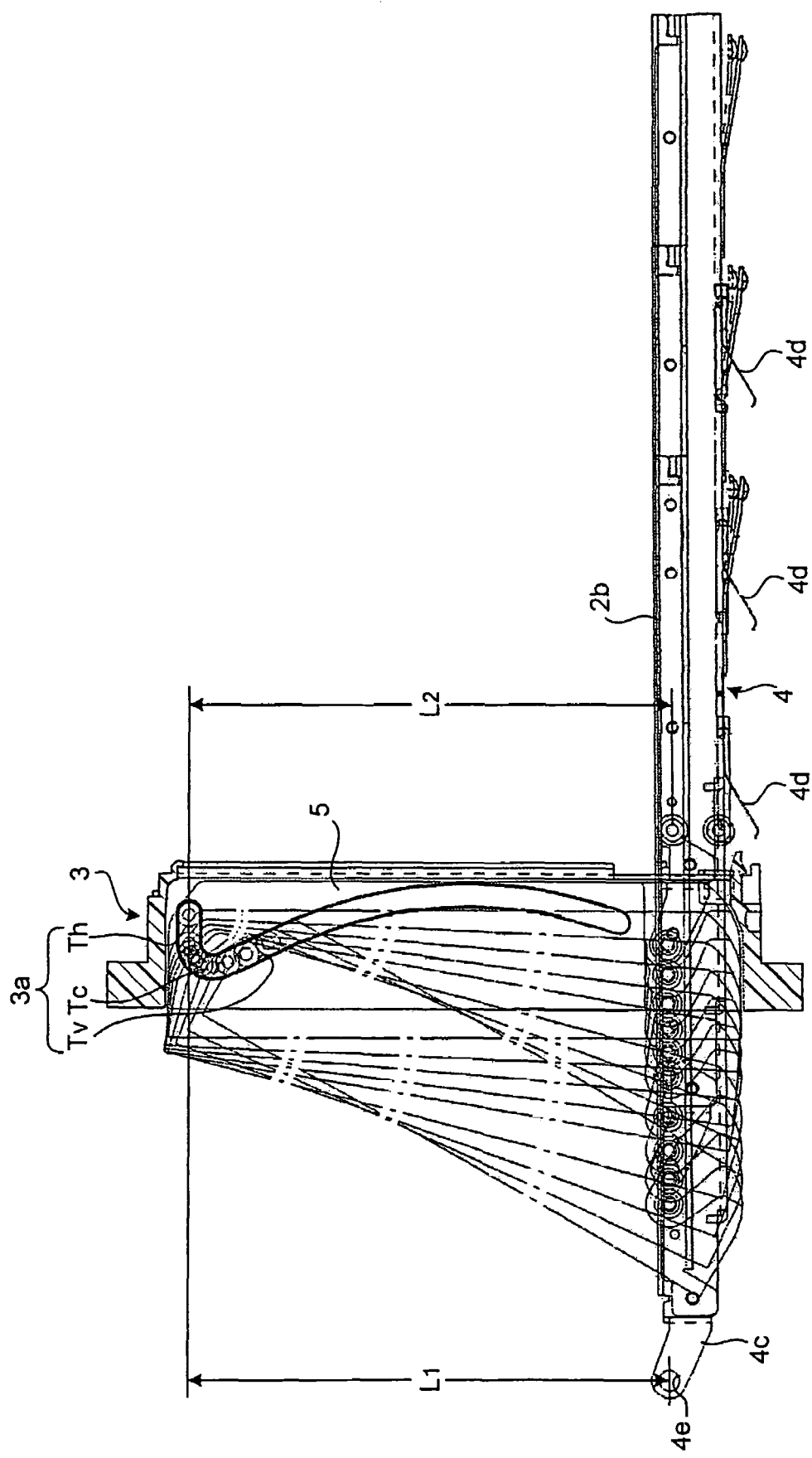
FIG. 4 is a course of inclining of the display panel conducted by a guide groove and a slider.

The front panel 3 is molded from synthetic resin in a frame shape, and is formed at both sides thereof with guide grooves 3a, as shown in FIGS. 2 to 4. As shown in FIG. 4, in each guide groove 3a, a horizontal groove Th that is for positioning the display panel in a vertical direction at a time of taking-in/out of the display panel is contiguously provided at an upper end of a vertical groove Tv formed to extend in a vertical direction via a curved groove Tc. Since the vertical groove Tv is a guide groove for drawing the display panel 5 out of the main unit 2 smoothly, it is gently curved in front and rear directions. On the other hand, since the horizontal groove Th is a guide groove for positioning the display panel 5 in a vertical direction and drawing the same in a horizontal direction, it is formed to have a length corresponding to the thickness of the display panel 5 in a horizontal direction (front and rear directions) thereof.

As shown in FIG. 2, the slider 4 is supported to guide rails 2b (only one thereof is shown) provided on both sides of the bottom plate 2a of the main unit 2 so as to be capable of being drawn out in a horizontal direction. The slider 4 is provided at an inner side of one of legs of a U-shaped plate member as viewed from the above with a rack 4a, and is formed with a roller hole 4b at a position adjacent to the rack 4a. The rack 4a meshes with a motor 6 via a gear train G provided on the bottom plate 2a. Two guide rollers 2c provided on the bottom plate 2a are disposed in the roller hole 4b, so that the slider 4 is guided during a drawing-out action or a drawing-in action thereof performed by the motor 6 relative to the main unit 2 in a horizontal direction. The slider 4 is provided on both sides thereof in a widthwise direction with arms 4c extending forward, and it is provided at proper portions on a lower face thereof with leaf springs 4d for urging the slider 4 upwardly, as shown in FIG. 4.

The display panel 5 is a movable panel constituted of a liquid crystal panel or the like, and it is accommodated in the front panel 3 in a standing state, as shown in FIG. 1. As shown in FIG. 3, the display panel 5 has a screen 5a disposed on a front thereof, and bearing 5b (only one is shown) provided at upper portions on both sides thereof. The display panel 5 is pin-connected at lower both sides thereof to the respective arms 4c of the slider 4 by inserting coupling pins (not shown) that are coupling shafts provided at lower side faces thereof into coupling holes 4e formed in the respective arms 4c of the slider 4 and bearings 5b positioned at both upper sides are slidably engaged with the guide grooves 3a of the front panel 3, so that the display panel 5 is supported to the main unit 2. At this time, the display panel 5 is positioned regarding a widthwise direction thereof to the main unit 2 at a time of accommodating thereof into the front panel 3 by causing the bearings 5b at the both upper sides to engage the guide groove 3a of the front panel 3.

The display apparatus 1 is assembled by arranging a unit including various electronic devices for reproducing a recording medium such as CD, MD, and DVD inside the main unit 2, and is mounted at a predetermined portion on a mount member such as a dashboard or an instrument panel in such a vehicle as an automobile. At the time of mounting, the display apparatus 1 is mounted on the mount member so as to conceal the front panel 3 with such a mount member as an instrument panel. In the display apparatus 1 mounted on the mount member in this manner, the display panel 5 is ordinarily accommodated in the front panel 3 in a standing manner, and a desired image is displayed on the screen 5a of the display panel.

When a recording medium such as CD is loaded in or unloaded from the main unit 2 in order to enjoy an audio device or the like inside the vehicle, the motor 6 is driven by pushing a predetermined operation button provided on the display panel 5. Thereby, the slider 4 is drawn out of the main unit 2 horizontally while being guided by the guide rails 2b and the guide rollers 2c. As a result, as shown in FIG. 4, the display panel 5 is first drawn out of the front panel 3 horizontally while the bearings 5b are being moved in the horizontal grooves Th. When the display panel 5 is drawn out of the front panel 3 horizontally by about a half of the thickness thereof and the bearings 5b are moved to the vertical grooves Tv via the curved grooves Tc, the display panel 5 starts inclining action as shown with a one dotted chain line in FIG. 4. After the display panel 5 is inclined to a horizontal state via an approximately half inclined state shown in FIG. 3, the recording medium is loaded in or unloaded from the main unit 2. After the loading or unloading of the recording medium is completed, the operation button is pushed. Thereby, the motor 6 is reversed so that the display panel 5 rises to be accommodated in the front panel 3 according to an action reversed to the above.

The display apparatus 1 is mounted on the mount member inside the vehicle to be used as described above. At this time, in the display apparatus 1, the guide grooves 3a is formed on both sides of the front panel 3 serving as an accommodating unit that accommodates the display panel 5 by providing the horizontal grooves Th for positioning the display panel in a vertical direction at a time of taking-in/out the display panel to the upper ends of the vertical grooves Tv formed to extend in a vertical direction via the curved grooves Tc continuously thereto. Therefore, in the display apparatus 1, when the display panel 5 is drawn out of the front panel 3 of the main unit 2 or it is accommodated therein, as shown in FIG. 4, the display panel 5 is guided by the horizontal grooves Th to be taken in/from the front panel 3 in a horizontal direction. Accordingly, since the front panel 3 is mounted so as to be concealed by a mount member such as an instrument panel, the display panel 5 is prevented from interfering with the mount member, so that the display apparatus 1 can be mounted with the minimum clearance formed between the display panel and the mount member.

Figure 5:
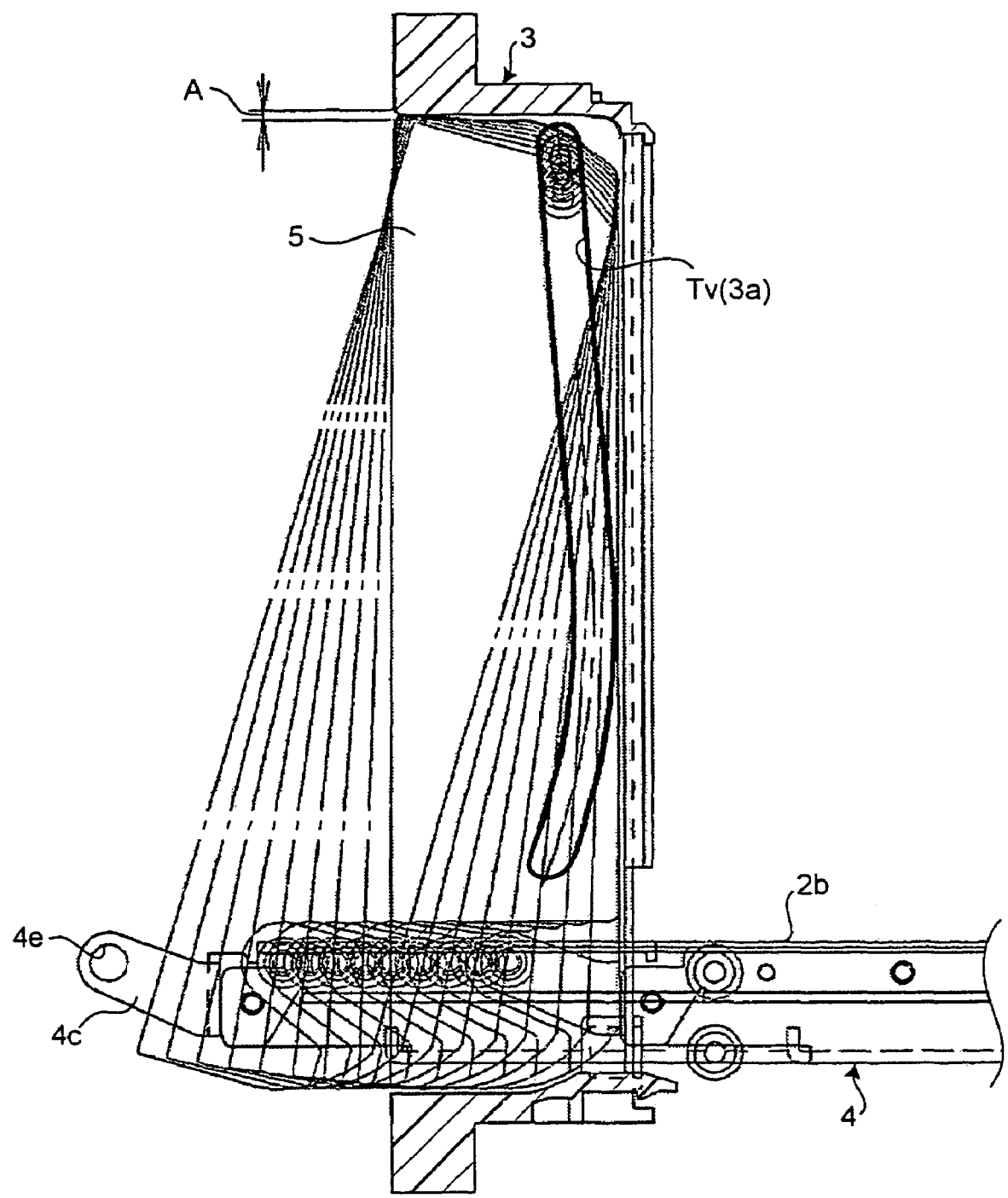
FIG. 5 is a course of inclining of the display panel conducted by a guide groove and a slider in a conventional display apparatus.

On the other hand, in a display apparatus with the conventional structure including a guide groove 3a constituted of only a vertical groove Tv, when the display panel 5 is taken in/from the front panel 3 of the main unit 2, an upper edge of the front portion of the display panel 5 is protruded upwardly by an amount indicated by arrow A, as shown in FIG. 5. Accordingly, when the display apparatus with the conventional structure is mounted such that the front panel 3 is concealed by such a mount member as an instrument panel, the display panel 5 interferes with the mount member easily, so that the display apparatus 1 cannot be mounted on the mount member with a small clearance between the display panel and the mount member.

Figure 6:
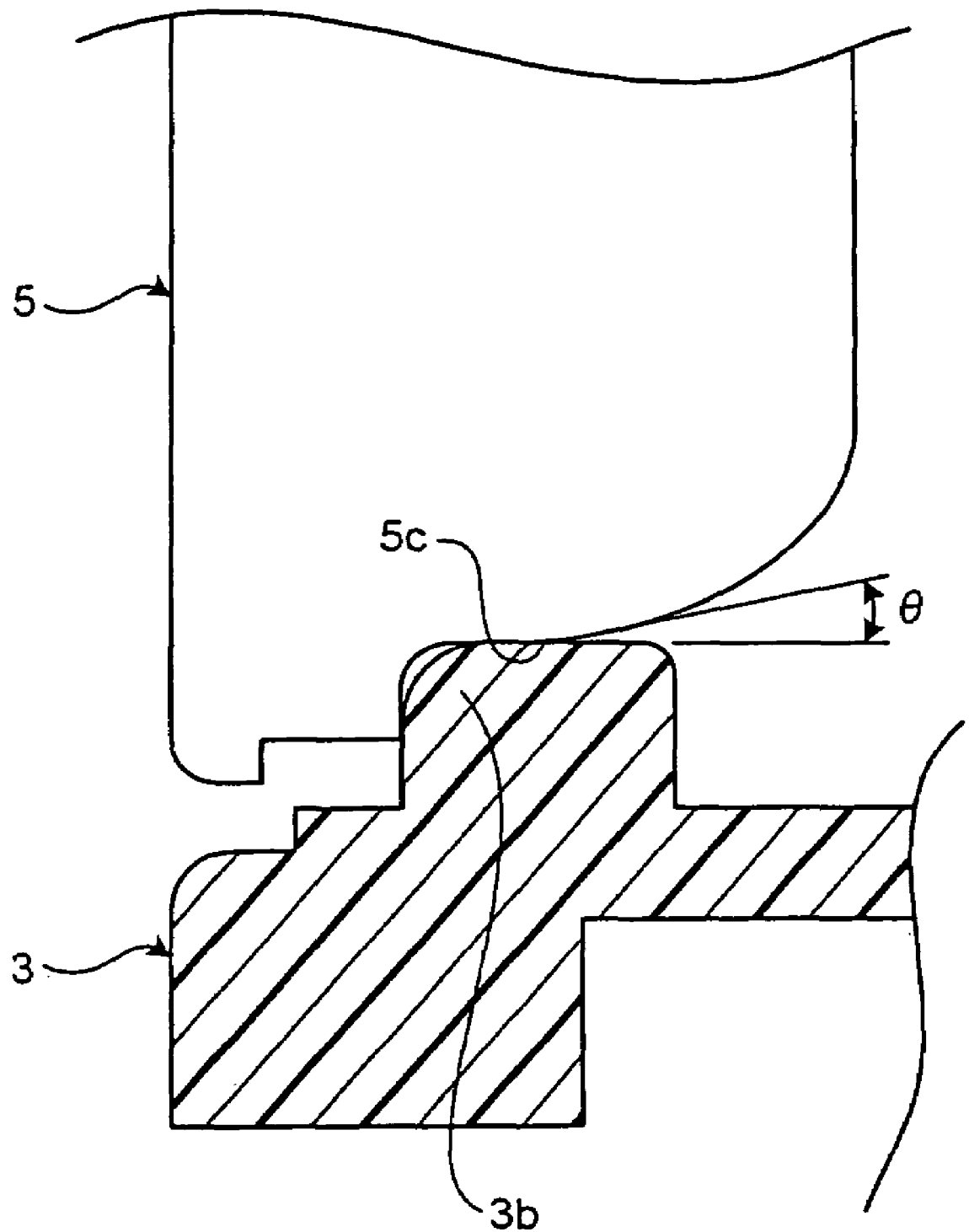
FIG. 6 is an enlarged sectional view of a unit that positions a front panel and the display panel in a vertical direction in the display apparatus shown in FIG. 1.

In the display apparatus 1, besides forming the guide groove 3a in the above manner, as shown in FIG. 6, a step 3b whose front portion is lowered toward a drawing-out direction of the display panel 5 is formed on an upper face of a lower potion of the front panel 3 and an inclination face 5c inclined by angle $\theta$ that is engaged with the step 3b and guides the display panel 5 to be drawn out obliquely downwardly is formed on a lower face of the display panel 5. With such a constitution, after the display panel 5 is drawn out horizontally by a predetermined distance corresponding to the length of the horizontal groove Th, the display panel 5 is drawn out obliquely downwardly due to the step 3b and the inclination face 5c, so that interference of the display panel 5 and such a mount member as an instrument panel with each other can be avoided and the display apparatus 1 can be mounted on the mount member with a reduced clearance between the display panel and the mount member.

As described above, since the guide groove 3a is constituted by providing the horizontal groove Th to be continuous to the upper end of the vertical groove Tv via the curved groove Tc, the display apparatus 1 can be mounted on such a mount member as an instrument panel with the minimum clearance between the display panel 5 and the mount member without interference of the former with the latter. Accordingly, the display apparatus 1 provides a favorable appearance and improves the beauty of the interior of the vehicle.

Figure 7:
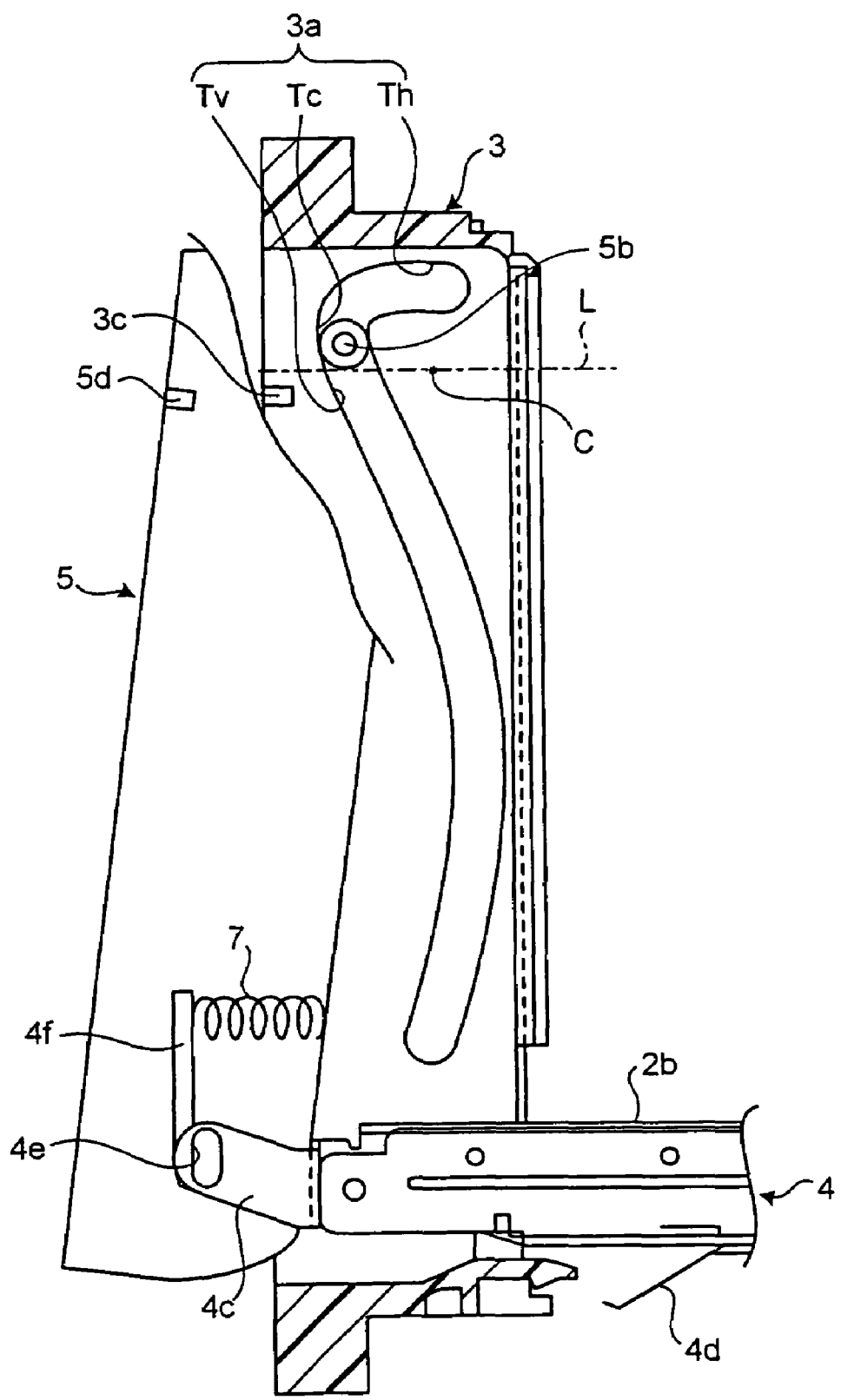
FIG. 7 is a modification of the display apparatus shown in FIG. 1.

As shown in FIG. 7, a bracket 4f is provided at the arm 4c of the slider 4 and a pressing spring 7 is provided between the bracket 4f and the display panel 5. When the bearing 5b is positioned on the side of the vertical groove Tv beyond a line L passing through a curve center C of the curved groove Tc of the guide groove 3a, the pressing spring 7 can apply a pressing force to the display panel 5 to assist taking-in/out of the display panel 5. At this time, the pressing spring 7 may be a leaf spring besides a coil spring illustrated. An elastic member such as a rubber member or a sponge member may be used if it can apply a pressing force to the display panel 5.

As shown in FIG. 7, the coupling hole 4e formed in the arm 4c is formed in an elongated hole extending in a vertical direction, the bearing 5b is moved while being guided by the guide groove 3a. Therefore, when the display panel 5 is inclined down or raised, a clearance between the bearing 5b and the pin-connected coupling hole 4e is provided with a margin, so that the display panel 5 can be operated smoothly by moving the same vertically.

The positioning accuracy of the display panel 5 to the front panel 3 in a vertical direction can be improved by providing one of the front panel 3 and the display panel 5 with a projection and providing the other with a recess. As shown in FIG. 7, for example, the front panel 3 is provided with a slit 3c while the display panel 5 is provided with a rib 5d. In this case, the slit 3c constituting the recess and the rib 5d constituting the recess are provided at positions where they do not obstruct horizontal movement of the display panel 5 to the front panel 3, and inclining or standing action of the display panel 5, namely, front sides of the front panel 3 and the display panel 5.

The display apparatus 1 according to the first embodiment includes the framed front panel 3 serving as the accommodating unit at the front portion of the main unit 2. However, a display apparatus 10 according to a second embodiment of the present embodiment does not have a front panel, where guide grooves engaged with the bearings 5b of the display panel 5 are formed on both sides of the main unit 2. In a display apparatus of each embodiment explained below, like constituent members as those of the display apparatus 1 according to the first embodiment are designated by like reference numerals as those thereof.

Figure 8:
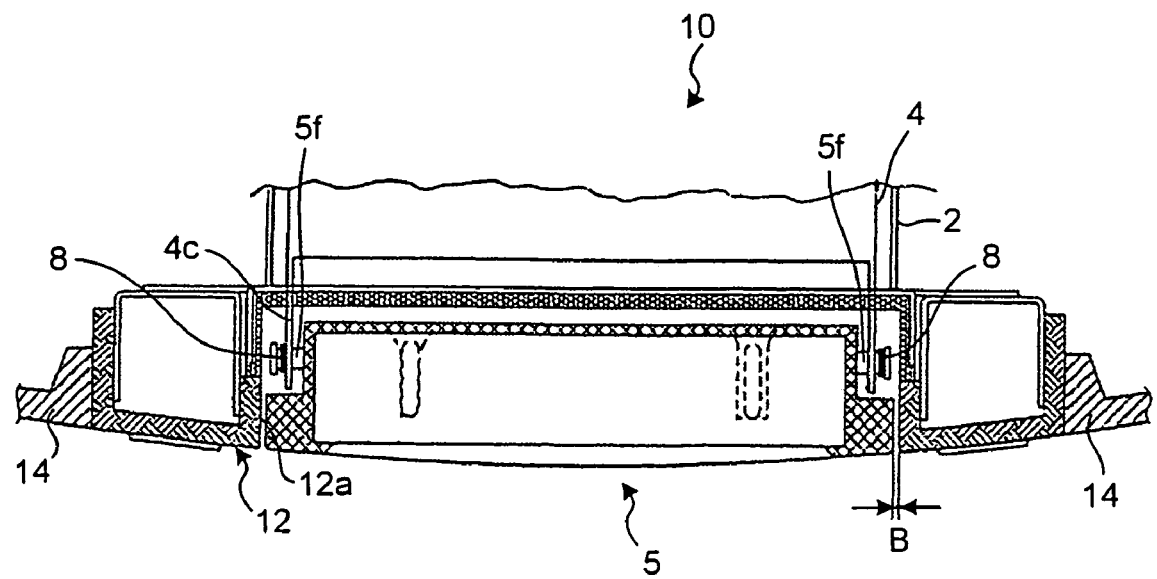
FIG. 8 is a sectional plan view of a main portion of a display apparatus according to a second embodiment of the present invention.
Figure 9:
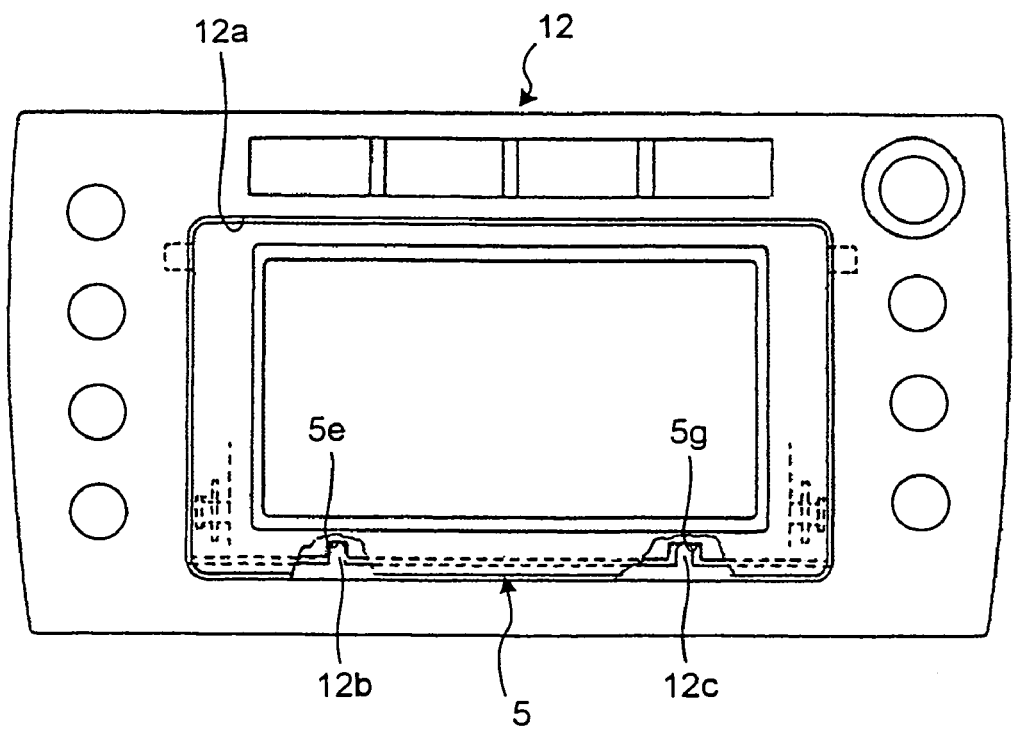
FIG. 9 is a front view of the display apparatus shown in FIG. 8.
Figure 10:
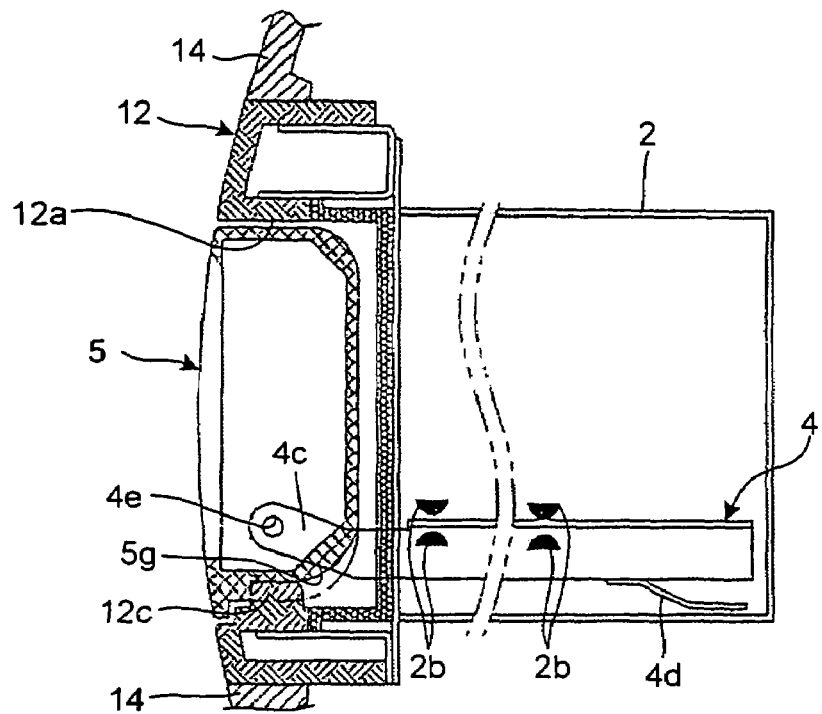
FIG. 10 is a vertical sectional view of the display apparatus shown in FIG. 8.

FIG. 8 is a sectional plan view of a principal portion of the display apparatus 10 according to the second embodiment. FIG. 9 is a front view of the display apparatus 10 shown in FIG. 8. FIG. 10 is a vertical sectional view of the display apparatus 10 shown in FIG. 8. The display apparatus 10 includes the main unit 2 and the display panel 5, and it is mounted on an instrument panel 14 via a framed member 12 with a mounting opening 12a, called "a cluster", which has been mounted on the vehicle mount member such as a dashboard or the instrument panel 14 in advance. As shown in FIGS. 8 and 9, the display panel 5 is formed on a lower face with a guide groove 5e, while the cluster 12 is provided at a position thereof corresponding to the guide groove 5e with a positioning rib 12b engaged with the guide groove 5e. Accordingly, the display panel 5 is positioned to the cluster 12 in a horizontal direction.

As shown in FIG. 8, the display panel 5 is pin-connected, at its both lower sides, to coupling holes 4e formed on respective arm 4c of the slider 4 via coupling pins 5f that are coupling shafts provided on the side faces of the display panel 5. Thereby, the display panel 5 can move to the slider 4 along an axial direction of the coupling pins 5f. At least one of the arms 4c has a pressing spring 8 disposed between a distal end of the coupling pin 5f inserted into the coupling hole 4e and the arm 4c. With such a constitution, in the display apparatus 10, when the display panel 5 is taken out from and taken in the main unit 2, chattering of the display panel 5 that may occur due to movement of the display panel 5 to the slider 4 along an axial direction of the coupling pin 5f can be suppressed from occurring.

As shown in FIGS. 8 to 10, the display panel 5 is formed on a lower face thereof with an engagement groove 5g, while the cluster 12 is provided at a position thereof corresponding to the engagement groove 5g with a positioning rib 12c that is calmly engaged with the engagement groove 5g. As shown in FIG. 10, the slider 4 provided on the main unit 2 is provided with clearances between the same and guide rails 2b disposed above and below, and it is urged upwardly by a leaf spring 4d. Accordingly, the display panel 5 is positioned to the cluster 12 in a vertical direction.

The display apparatus 10 thus constituted can be positioned to the cluster 12 in a vertical direction and in a horizontal direction with a high precision. Therefore, when the display apparatus 10 is mounted on the instrument panel 14 via the cluster 12, the display apparatus 10 can be mounted on the cluster 12 with the minimum clearance indicated by arrow B (see FIG. 8), which results in improvement in beauty of an appearance.

Such a constitution may be employed that the display panel 5 is formed on its lower face with a positioning rib, while the cluster 12 is provided with a guide groove engaged with the rib at a portion thereof corresponding to the rib. Alternatively, such a constitution may be employed that the display panel 5 is provided on its side face with a guide groove or a positioning rib, while a positioning rib or a guide groove is provided on a portion of an inner face of the cluster 12 corresponding thereto. With such a constitution, the display apparatus 10 can be positioned relative to the cluster 12 in a vertical direction and in a horizontal direction. Additionally, an appearance is further improved when the display panel 5 has been drawn out of the main unit 2, as compared with the case when a guide groove or the like is provided on the lower portion of the display panel.

The display apparatus 1 according to the first embodiment includes a constitution that the slider 4 is supported by the guide rails 2b provided at both sides of the bottom plate 2a of the main body 2 so that the slider 4 is prevented from moving relative to the main unit 2 in a horizontal direction. On the other hand, a display apparatus according to a third embodiment of the present invention is constituted such that the slider 4 is movable relative to the main unit 2 in a horizontal direction.

Figure 11:
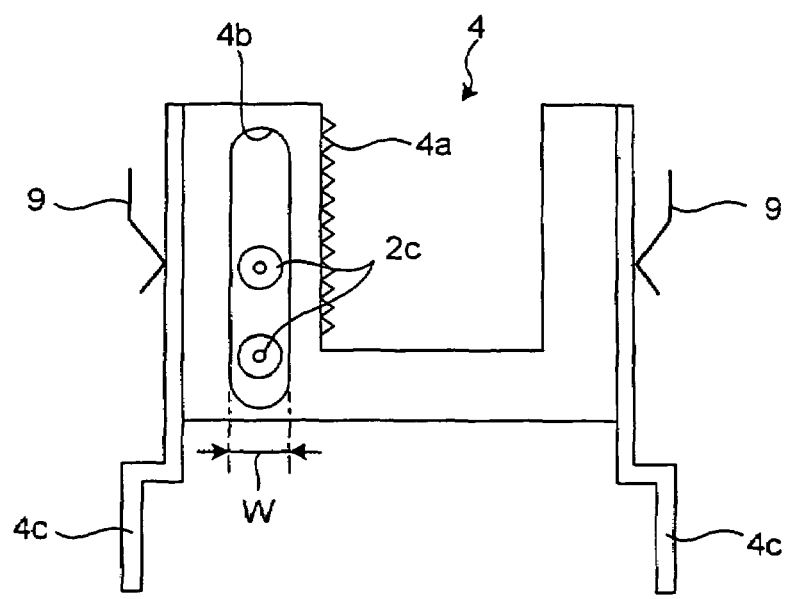
FIG. 11 is a schematic plan view of a slider used in the display apparatus, for explaining a display apparatus according to a third embodiment of the present invention.

That is, in the display apparatus according to the third embodiment, as shown in FIG. 11, the slider 4 is constituted such that a width W of a roller hole 4b where two guide rollers 2c provided on the bottom plate 2a are disposed is set to be wider than a diameter of each guide roller 2c. Accordingly, when the slider 4 thus constituted is used, the slider 4, namely, the display panel 5 can move slightly in a horizontal direction by a difference between the width of the roller hole 4b and the diameter of the guide roller 2c in the display apparatus. Accordingly, the display apparatus according to the third embodiment can be positioned to the cluster 12 by finely adjusting a relative position between the main unit 2 and the display panel 5, and the display apparatus can be mounted on a mount member of a vehicle such as an instrument panel with a minimum clearance between the display apparatus and the cluster 12, so that an appearance of the display apparatus can be improved.

In this case, since the slider 4 can be slightly moved in a horizontal direction, chattering of the slider 4 may occur. Accordingly, as shown in FIG. 11, leaf springs 9 are disposed on both outer sides of the slider 4 so that the slider 4 is pressed from both sides of the main unit 2.

The display apparatus according to the third embodiment is constituted such that the display panel 5 can be moved slightly in a horizontal direction by setting the width of the roller hole 4b to be broader than the diameter of the guide roller 2c. On the other hand, a display apparatus according to a fourth embodiment of the present invention is constituted such that the display panel 5 is movable relative to the main unit 2 in a vertical direction.

Figure 12:
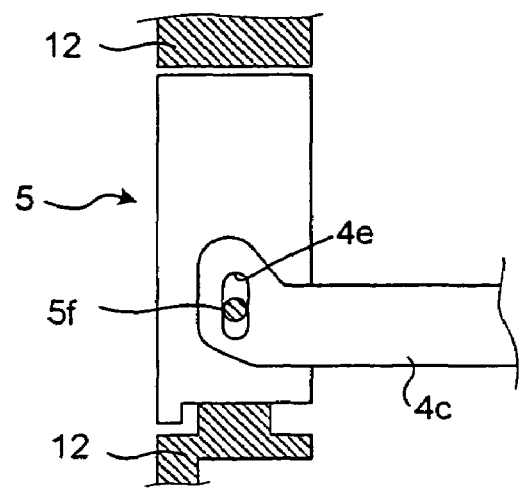
FIG. 12 is a enlarged schematic view of a coupling portion of an arm and a display panel, for explaining a display apparatus according to a fourth embodiment of the present invention.

That is, as shown in FIG. 12, in the display apparatus according to the fourth embodiment, the coupling hole 4e of the arm 4c of the slider 4 is formed in an elongated hole extending in a vertical direction. With such a constitution, when the display panel 5 is inclined or raised, a margin is provided to a clearance between the bearing 5b and the coupling hole 4e so that the display panel 5 can be operated smoothly by moving the display panel 5 in a vertical direction. Accordingly, the display panel 5 is positioned to the cluster 12 according to vertical movement of the coupling pin 5f within the coupling hole 4e, and the display apparatus according to the fourth embodiment can be mounted on a mount member of a vehicle such as an instrument panel with a minimum clearance between the display panel 5 and the cluster 12, which results in improvement in appearance.

The display apparatus according to the fourth embodiment is constituted such that the display panel 5 can be moved in a vertical direction to be positioned relative to the cluster 12 by forming the coupling hole 4e of the arm 4c in the elongated hole extending in a vertical direction. On the other hand, a display apparatus according to a fifth embodiment of the present invention is constituted such that the display panel 5 is positioned to the cluster 12 utilizing positioning rollers.

Figure 13:
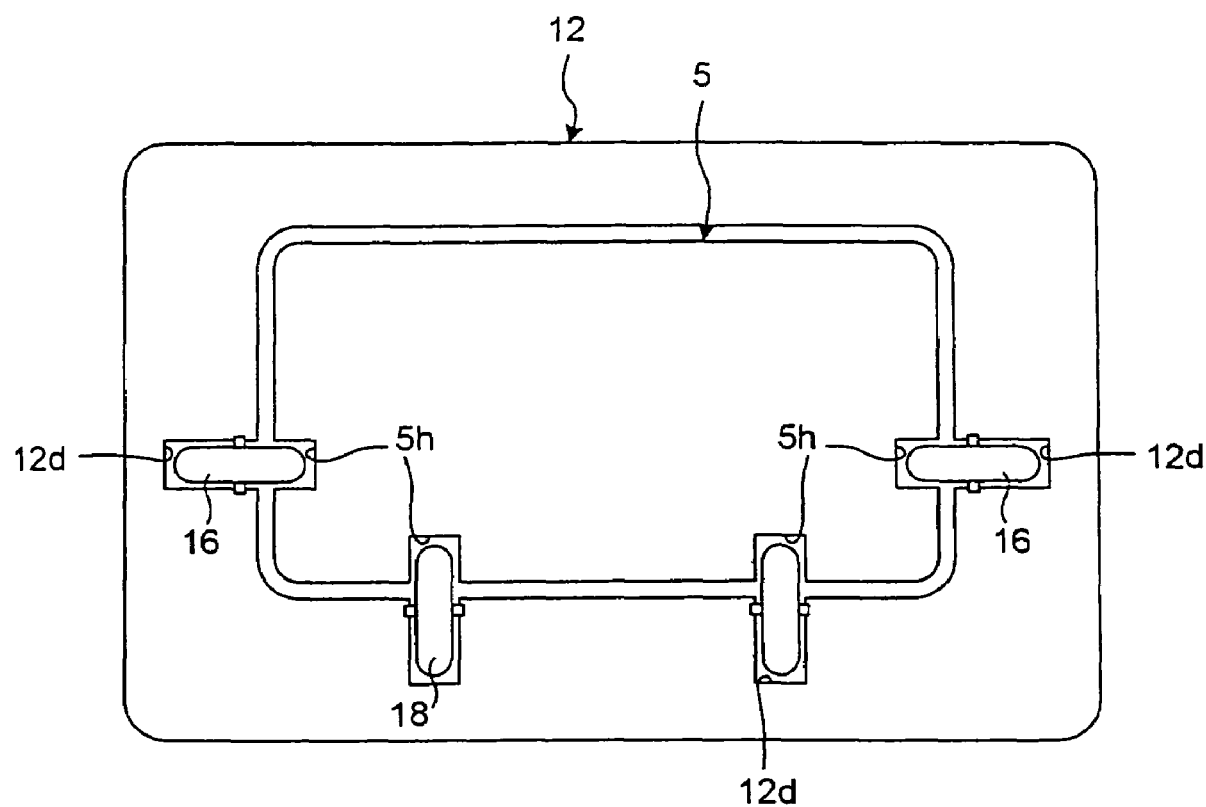
FIG. 13 is a schematic view of an aspect where a display panel is positioned to a cluster utilizing a positioning roller, for explaining a display apparatus according to a fifth embodiment of the present invention.

That is, as shown in FIG. 13, the display apparatus according to the fifth embodiment is constituted such that the display panel 5 is positioned to the cluster 12 in a horizontal direction and in a vertical direction by forming recessed 5h and 12d in the display panel 5 and the cluster 12 and disposing positioning rollers 16, 18 supported to the cluster 12 in the recesses 5h and 12d. Accordingly, the display apparatus according to the fifth embodiment can be mounted on a mount member of a vehicle such as an instrument panel with a minimum clearance formed between the display panel 5 and the cluster 12, which results in improvement in appearance.

Figure 14:
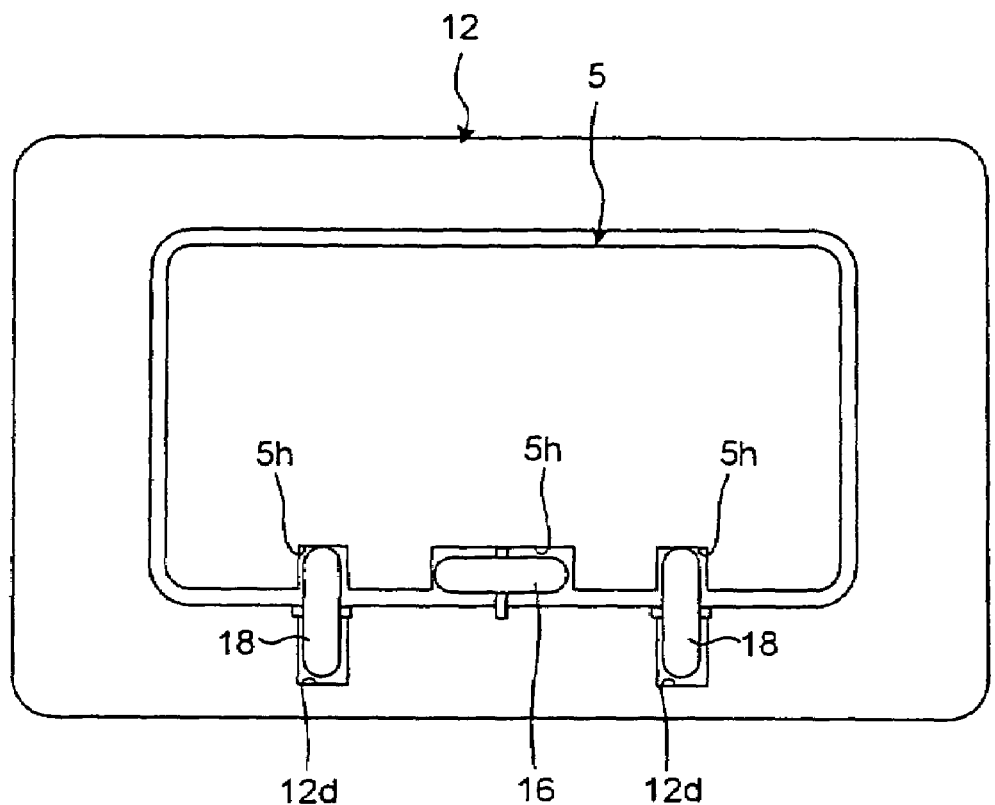
FIG. 14 is a schematic view of a modification of the positioning roller shown in FIG. 13.

At this time, as shown in FIG. 14, when the positioning roller 16 that positions the display panel 5 in a horizontal direction is shifted by an angle of 90° from the state thereof shown in FIG. 13 to be supported to the cluster 12, one positioning roller may be provided at a center in the horizontal direction, which is more economical than a case when two positioning rollers are provided in a horizontal direction.

Figure 15:
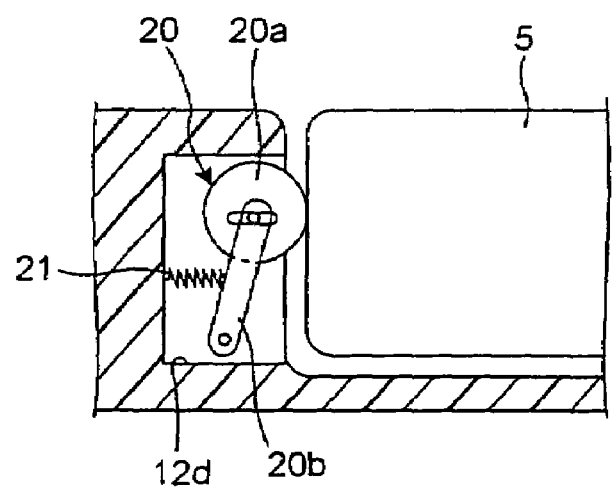
FIG. 15 is a schematic view of another modification of the positioning roller shown in FIG. 13.

The positioning rollers 16 and 18 are formed of rubber or synthetic resin having elasticity for suppressing chattering, which occurs at a time of taking-in/out of the display panel 5 in the display apparatus. For example, as a positioning roller 20 shown in FIG. 15, such a constitution can be employed for the positioning roller that chattering occurring at a time of taking-in/out the display panel 5 is suppressed by pressing an arm 20b supporting a roller 20a to the display panel 5 by a pressing spring 21. In this case, the positioning roller 20 is effective, especially, for positioning the display panel 5 in a horizontal direction or when the roller 20a is hard.

Figure 16:
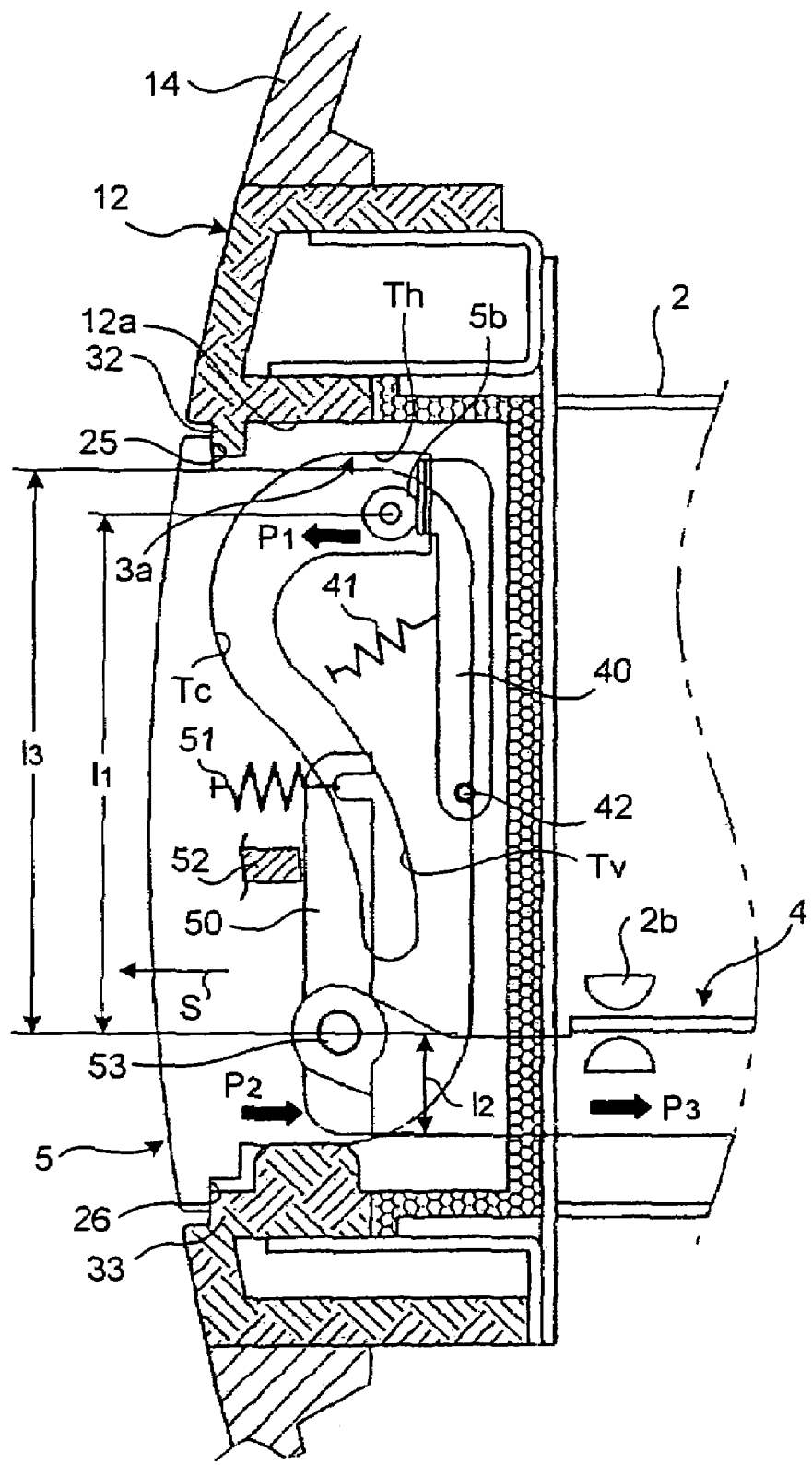
FIG. 16 is a vertical sectional view of a main portion for explaining a display apparatus according to a sixth embodiment of the present invention.

In the display apparatus according to a sixth embodiment of the present invention, like constituent elements as those in the display apparatus according to the above embodiments are designated by like reference numerals. FIG. 16 is a vertical sectional view of a principal portion of the display apparatus according to the sixth embodiment of the present invention. The display apparatus according to the sixth embodiment is constituted such that the guide groove (the horizontal groove Th) extending in a horizontal direction is selected to be wider in order to allow translation of the display panel 5 at a time of taking-out the display panel 5 and prevent variations due to tolerance and a problem about stepping movement of the display panel 5 at a time of accommodating thereof is solved by selecting an inclined angle (about 0.5°) of the display panel 5.

That is, as shown in FIG. 4 described above, when the distance between the center point of the bearing 5b positioned in the horizontal groove Th and the rotational center of the slider 4 is always the same (distance $L_1$=distance $L_2$), the display panel 5 can maintain its smooth translation, but the respective distances include tolerances. For example, when $L_1 < L_2$, since an upper side of the display panel 5 is inclined forward during movement thereof, such a drawback may occur that the display panel 5 is not closed completely.

On the other hand, when $L_1 > L_2$, since a lower portion of the display panel 5 is inclined forward, such a drawback may occur that a lower side of the display panel 5 is not closed completely. Therefore, in order to solve such a drawback due to variations in tolerance, such means that the horizontal groove Th extending horizontally is made wide (large) is employed in the sixth embodiment. Further, when the horizontal groove Th is made wide in this manner, since the display panel 5 is moved while being inclined. This may lead to a problem that an upper end of the display panel 5 interferes with an end edge of the cluster 12, which is an original concern for the display apparatus. Accordingly, the sixth embodiment is provided with a pressing lever 40 that moves the display panel 5 within the horizontal groove Th while pressing the same such that the display panel 5 can move while maintaining its upright state.

As shown in FIG. 16, the display apparatus includes the main unit 2 and the display panel 5. The display panel 5 is mounted on a vehicle mount member such as a dashboard or an instrument panel via a framed member 12 with a mounting opening 12a, called "a cluster", which has been mounted on the mount member in advance. A step 32 positioned on an upper side in FIG. 16 and a step 33 positioned on a lower side in FIG. 16 are formed around the mounting opening 12*a* of the cluster 12, and the display panel 5 is accommodated in a state that ends 25 and 26 of the display panel 5 come in contact with the steps 32 and 33.

The slider 4 is provided to be freely drawn out in a horizontal direction, and a distal end of the slider 4 is coupled with an inclining lever 50. That is, a pivoting shaft 53 is provided at the distal end of the slider 4, the pivoting shaft 53 and a proximal end of the inclining lever 50 are coupled to each other, and a pressing spring 51 that applies a tension in a direction S in FIG. 16 is attached to the distal end of the inclining lever 50. A reference numeral 52 denotes a supporting member that supports the inclining lever 50 at a predetermined position. The display panel 5 is restricted from being inclined forward (the left side in FIG. 16) by contact between a lower end edge of the inclining lever 50 and a distal end edge of the slider 4 (indicated with "a" portion in FIG. 17).

An inclined angle of the display panel 5 during translation thereof can be adjusted by the contacting position of the lower end edge of the inclining lever 50 and the distal end edge of the slider 4. Accordingly, as described later, since the sixth embodiment employs a constitution that a lower portion of the display panel 5 is inclined by a predetermined angle (0.5°), stepping occurring during accommodating operation of the display panel 5 can be minimized.

The main unit 2 is provided with the pressing lever 40 that presses the bearing 5*b* fixed at an upper end of the display panel 5 forward (leftward in FIG. 16) by a spring force of a pressing spring 41. The bearing 5*b* can be moved within the guide groove 3*a* by the pressing lever 40 rotated about a pivoting shaft 42 by a spring force of the pressing spring 41.

The guide groove 3*a* includes a horizontal groove Th that extend in a horizontal direction and is formed to be wider than a vertical groove Tv formed to extend in a vertical direction of the main unit 2, and a curved groove Tc that connects the horizontal groove Th and the vertical groove Tv. Accordingly, the bearing member 5*b* is moved via the horizontal groove Th by a spring force of the pressing lever 40 according to forward (leftward in FIG. 16) movement of the slider 4. The problem about the variations due to tolerances can be solved by the horizontal groove Th formed in a wider shape. At this time, the display panel 5 can be translated while being kept in an upright state, so that a width size that allows tolerances causing variations can be selected.

It is necessary to set a spring force (torque) of the pressing spring 51 to be larger than a spring force (torque) of the pressing spring 41 that is a torque for pivoting the display panel 5 and it is also necessary to set the spring force of the pressing spring 51 to be smaller than a drawing-in force of the slider 4 for drawing the display panel 5 in. Therefore, in the sixth embodiment, when the torque of the pressing spring 41 is represented as $P_1$ (a distance between the pivoting shaft 53 and the bearing 5*b* is $I_1$), the torque of the pressing spring 51 is represented as $P_2$ (a distance between the pivoting shaft 53 and the lower end of he slider 4 is $I_2$), and the torque of the slider 4 is represented as $P_3$ (a distance between the pivoting shaft 53 and the end 25 of the display panel 5 is $I_3$), a condition for meeting a relational expression of $P_1 \times I_1 > P_2 \times I_2 > P_3 \times I_3$ is required.

Figure 17:
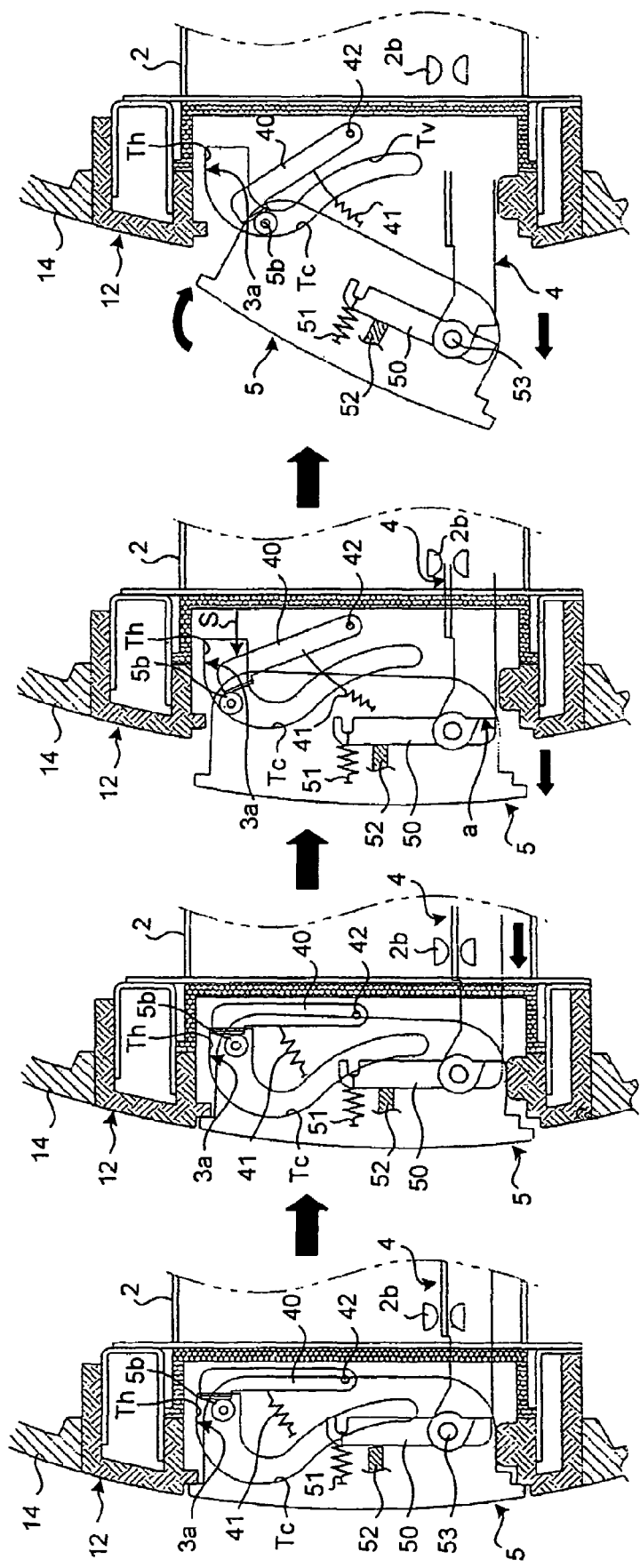
FIG. 17 is an explanatory view of a state where a display panel has been drawn out.

FIG. 17 is an explanatory view of a transient action of the display panel 5 to its projected state. That is, when the slider 4 starts forward movement (left side of FIG. 17) from an accommodated state of the display panel 5, a lower end 26 of the display panel 5 starts separation earlier than an upper end 25 thereof. As described above, this is because the inclined angle of the display panel 5 is set to 0.5° and the inclined angle of the display panel 5 is maintained by the pressing spring 51.

Since the pressing lever 40 is pivoted about the pivoting shaft 42 in a direction S in FIG. 17 by the spring force of the pressing spring 41 according to further movement of the slider 4, the bearing 5*b* is pressed to move within the horizontal groove Th according to pivoting of the pressing lever 40. Thereby, the display panel 5 starts forward (left side of FIG. 17) translation. At that time, since the end edge of the inclining lever 50 and the distal end edge of the slider 4 are brought into contact with each other (at the point "a" in FIG. 17), a restricting force that prevents the display panel 5 from inclining forward (left side of FIG. 17) acts on the display panel 5 owing to the contact of the end edges.

The bearing 5*b* of the display panel 5 is moved from the horizontal groove Th toward the curved groove Tc by a pressing force of the pressing lever 40 according to further movement of the slider 4. When the bearing 5*b* reaches the curved groove Tc, an upper side of the display panel 5 is deviated inwardly about the pivoting shaft 53 together with the inclining lever 50 in a clockwise direction. At that time the pressing spring 51 acts in such a direction as to support pivoting of the display panel 5. Thereafter, the display panel 5 can be drawn outside the cluster 12 in a state that the display panel 5 has been inclined by a predetermined angle and the position thereof has been restricted by the vertical groove Tv.

Figure 18:
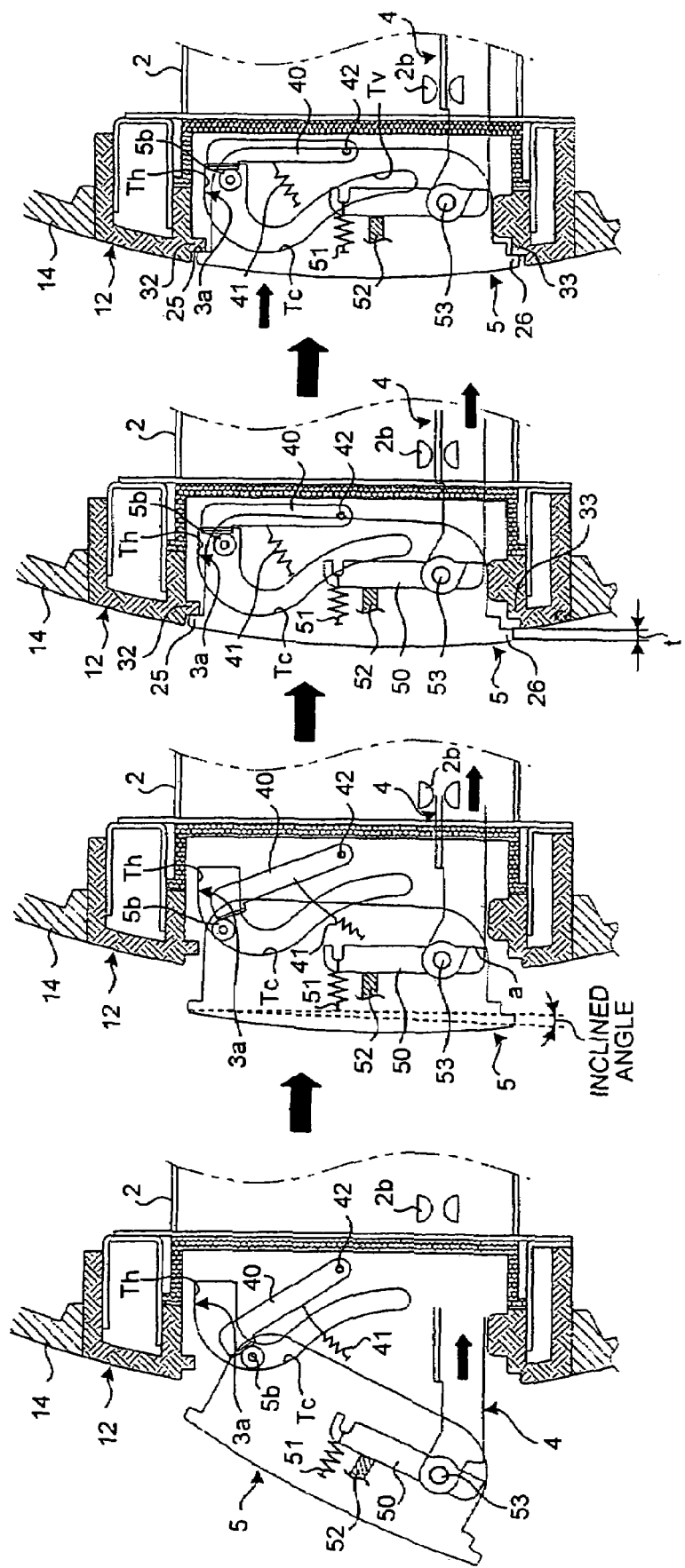
FIG. 18 is an explanatory view of an accommodated state of the display panel.

FIG. 18 is an explanatory view of a transient action of the display panel 5 to its accommodated state. That is, as shown in FIG. 17, when the slider 4 starts backward movement (right side of FIG. 18) from a state that the display panel 5 has projected, an upper side of the display panel 5 starts pivoting toward an upright state together with the inclining lever 50 pivoting in a counterclockwise direction about the pivoting shaft 53 of the slider 4 by the spring force of the pressing spring 51 according to the movement of the slider 4. The bearing 5*b* of the display panel 5 starts movement from the curved groove Tc toward the horizontal groove Th against the pressing force due to the pressing lever 40 according to further movement of the slider 4. As described above, since the inclined angle (0.5°) of the display panel 5 is set by the contacting position between the end edge of the inclining lever 50 and the distal end edge of the slider 4, the display panel 5 is translated in the state that the lower portion of the display panel 5 has been slightly inclined. Specifically, the upper end 25 of the display panel 5 is brought in contact with the step 32 of the cluster 12, while the display panel 5 is being inclined by an angle of 0.5°. Finally, the lower end 26 of the display panel 5 is brought in contact with the lower step 33 of the cluster 12 so that accommodation of the display panel 5 is completed.

As explained above, since the upper end 25 can be brought in contact with the step 32 earlier than the lower end 26 by a predetermined distance (t=1.5 mm) by setting the inclined angle of the display panel 5 during movement thereof, a step difference between the upper end and the lower end of the display panel 5 can be minimized.

With the display apparatus constituted above, the display panel 5 can be positioned to the cluster 12 in a vertical direction and a horizontal direction with a high precision, and the display panel 5 can be accommodated smoothly through translation thereof by preventing variations of tolerances (sizes). By minimizing a step difference occurring at a time of accommodating the display panel 5, mounting can be performed with the minimum clearance between the display panel 5 and the cluster 12, which can further improve an appearance.

According to the present invention, since a display panel and a constituent member can be positioned at a proper position, an in-vehicle display apparatus that allows further reduction in a clearance between the display panel and a mount member such as an instrument panel at a mount time of the display apparatus. According to the present invention, since the display panel can be positioned in a vertical direction and a horizontal direction with a high accuracy and the horizontal groove extending in a horizontal direction is formed to be wider, variations in tolerance (size) can be absorbed to be corrected. As a result, taking-out according to translation of the display panel can be made excellent.

Since a step occurring at a time of accommodating the display panel 5 can be made minimum by slightly inclining the display panel 5 to perform movement at the time of accommodating, an in-vehicle display apparatus that allows assembling of the display panel with a minimum clearance, and allows further improvement in an appearance thereof can be provided.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A display apparatus comprising:
    a main unit including a slider and a guide groove;
    a display panel including a slider engaging portion coupled to the slider and a guide-groove engaging portion slidably engaged with the guide groove, wherein the slider engaging portion is guided by the slider and the guide-groove engaging portion is guided by the guide-groove so that display can be inclined; and
    a pressing lever pressing the guide-groove engaging portion with resilient force of a resilient member, wherein the guide-groove includes
        a parallel groove formed in parallel with a first direction which is a direction of movement of the slider; and
        a curved groove having a width narrower than that of the parallel groove and being connected to the parallel groove, and
    the guide-groove engaging portion moves in the parallel groove by the movement of the slider and a pressing force of the pressing lever.

2. The display apparatus according to claim 1 further comprising:
    an engagement member provided on the main unit; and
    a slide hole provided on the slider and engaged with an engagement member,
    wherein the side hole is an elongated hole which extends in a same direction as the first direction, and having a width wider than that of the engagement member in a second direction that is perpendicular to the first direction.

3. The display apparatus according to claim 1 further comprising:
    a coupling shaft provided on one of the slider and the main unit;
    an engagement hole provided on the other thereof, and coupled to the coupling shaft,
    wherein the engagement hole is an elongated hole which extends in a third direction which is perpendicular to the first direction.

4. The display apparatus according to claim 1 further comprising:
    an inclining lever coupled to the slider and provided on the main unit so as to rotate around a distal end of the slider;
    an inclining-lever resilient member provided on the main unit to apply the resilient force to the inclining lever in the first direction,
    wherein an angle of the display panel, at a time when the guide-groove engaging portion guided along the parallel groove, is set according to a contacting position between the inclining lever and the distal end of the slider.

5. The display apparatus according to claim 4 further comprising:
    a supporting member supporting the inclining lever,
    wherein an inclining angle of the display panel is set according to a position of a supporting member and a resilient force of the inclining-lever resilient member.

6. The display apparatus according to claim 1 further comprising:
    a display-panel positioning portion provided on the display panel;
    a main-unit positioning portion engaged with the display-panel positioning unit and provided on the main unit,
    wherein the display panel is coupled to the slider so that display panel is movable in a second direction perpendicular to the first direction and is positioned to the main unit in the second direction by the display-panel positioning portion and the main-unit positioning portion.

7. The display apparatus according to claim 1 further comprising:
    a mount member assembled with the display apparatus;
    a display-panel positioning portion provided on the display panel; and
    a mount-member positioning portion engaged with the display-panel positioning portion and provided on the mount member,
    wherein the display panel is coupled to the slider so that display panel is movable in a second direction perpendicular to the first direction and is positioned on the mount member in the second direction by the display-panel positioning portion and the mount-member positioning portion.

8. The display apparatus according to claim 1 further comprising:
    a display-panel positioning portion provided on the display panel;
    a main-unit positioning portion engaged with the display-panel positioning portion and provided on the main unit; and
    a guiding portion guiding the slider in the first direction and provided on the main unit so as to have a clearance in a third direction perpendicular to the first direction, wherein the clearance is formed between the guiding unit and the slider and
    wherein the display panel is positioned to the main unit in the third direction by the display-panel positioning position and the main-unit positioning portion.

9. The display apparatus according to claim 1 further comprising:
- a mount member assembled with the display apparatus;
- a display-panel positioning portion provided on the display panel;
- a mount-member positioning portion engaged with the display-panel positioning portion and provided on the mount member; and
- a guiding portion guiding the slider in the first direction and provided on the main unit so as to have a clearance in a third direction perpendicular to the first direction, wherein the clearance is formed between the guiding unit and the slider, wherein
- the display panel is positioned on the mount member in the third direction by the display-panel positioning portion and the mount-member positioning portion.

10. The display apparatus according to claim 1 further comprising:
- a positioning portion provided on one of the display panel and the main unit,
- wherein the display panel is coupled to the slider so that display panel is movable in a second direction perpendicular to the first direction and is positioned on the main unit in the second direction by the positioning portion.

11. The display apparatus according to claim 1 further comprising:
- a mount member assembled with the display apparatus;
- a positioning portion providing on one of the display panel and the mount member,
- wherein the display panel is coupled to the slider so that display panel is movable in a second direction perpendicular to the first direction and is positioned on the main unit in the second direction by the positioning portion.

12. The display apparatus according to claim 1 further comprising:
- a positioning portion provided on one of the display panel and the main unit
- a guiding portion guiding the slider in the first direction, and provided on the main unit so as to have a clearance in a third direction perpendicular to the first direction, wherein the clearance is formed between the guiding unit and the slider,
- wherein the display panel is positioned on the mount member in the third direction by the positioning portion.

13. The display apparatus according to claim 1 further comprising:
- a mount member assembled with the display apparatus;
- a positioning portion provided one of the display panel and the mount member; and
- a guiding portion guiding the slider in the first direction and provided on the main unit so as to have a clearance in a third direction perpendicular to the first direction, and formed between the guiding portion and the slider,
- wherein the display panel is positioned on the mount member in the third direction by the positioning portion.

* * * * *

UNITED STATES PATENT AND TRADEMARK OFFICE
CERTIFICATE OF CORRECTION

| | | |
|---|---|---|
| PATENT NO. | : 7,356,954 B2 | Page 1 of 1 |
| APPLICATION NO. | : 10/999138 | |
| DATED | : April 15, 2008 | |
| INVENTOR(S) | : Yukio Shimizu and Shinsuke Yuri | |

It is certified that error appears in the above-identified patent and that said Letters Patent is hereby corrected as shown below:

In the Title page, column 1, please insert the Foreign Priority Data as follows:

--[30]   Foreign Application Priority Data
    Dec. 01, 2003   [JP]   ........................2003-402143.--

Signed and Sealed this

Fifth Day of August, 2008

JON W. DUDAS
*Director of the United States Patent and Trademark Office*